Patented May 25, 1926.

1,586,099

UNITED STATES PATENT OFFICE.

ERNEST MARTIN, OF AIX-EN-PROVENCE, FRANCE.

MANUFACTURING PROCESS FOR CEMENTS CONTAINING IRON AND ALUMINA COMBINATIONS.

No Drawing. Application filed September 11, 1924. Serial No. 737,129.

This invention relates to a process of manufacturing cements containing, after burning, iron or aluminum combinations possessing hydraulic binding qualities, or mixtures of these ingredients, the cements being obtained by burning the mixed raw materials at a temperature less than the melting temperature of any of the ingredients composing the mixture.

The formation of a cement containing iron combinations is based on the following experimental results:

A mixture of iron oxide or iron hydrates and $CaCO_3$, containing two molecules or less of $CaCO_3$ for each molecule of $Fe_2O_3$ or equivalent, after burning does not give a product possessing hydraulic qualities, whatever the burning temperature may be. The iron combinations formed do not possess binding properties.

A mixture richer in lime than as above indicated, that is to say, a mixture containing more than two molecules of $CaCO_3$ for one molecule of $Fe_2O_3$ gives under certain burning conditions a product which binds hydraulically.

The combination of the iron oxide with the lime begins at the temperature at which limestone dissociates. By continuing the burning without, however, reaching the lowest melting point of the materials composing the mixture, a product is obtained which possesses a slow binding action. As soon as the melting temperature is reached the product obtained is of minor quality and the melted material does not possess hydraulic binding properties. For this reason the melting of the mixture during the burning should be avoided.

The mixture giving the best product for binding is composed of three molecules of $CaCO_3$ for each molecule of iron oxide $(Fe_2O_3)$ but the mixing ratios may slightly vary without detriment to the finished product.

When the raw materials employed contain flint or alumina it is necessary to add to the mixture one molecule of $CaCO_3$ for each molecule of alumina $(Al_2O_3)$ and two molecules of $CaCO_3$ for each molecule of flint $(SiO_2)$.

The raw materials susceptible of being utilized in the manufacture of a cement according to the invention are, besides limestone, iron pyrite cinders resulting from the sulphuric acid manufacturing process, iron ores, ores, residuals of aluminum factories, bauxite, etc., and these materials may be employed separately or in combination.

When utilizing iron pyrite cinders it is necessary to add for each atom of the sulphur present in the ashes as a sulphide one molecule of $CaCO_3$ to neutralize the sulphur.

The mixing up of the previously pulverized raw materials containing the quantity of $CaCO_3$ as set forth above may be done either directly or with the addition of water according to the type of kiln used, and the kiln may be of any known type.

The burning temperature varies between 1100° and 1300° centigrade according to the raw materials treated. The essential point is to thoroughly burn without reaching the melting point. The product coming from the kiln must be pulverulent and must present no traces of melting.

If necessary to complete the reactions in the mixture to be treated, the burning may be carried out in two or more stages. In this manner the mixture after the first burning is thoroughly mixed in any condition and subsequently submitted to treatment in the kiln while always avoiding reaching the melting point.

The cements containing iron combinations prepared according to the process set forth are composed of iron combinations (ferrites) possessing hydraulic binding qualities and also aluminates or ferri-aluminates possessing the same qualities when the raw materials employed contain alumina.

The usual iron oxide of ordinary cements obtained by fusion, as well as the alumina cements also obtained by fusion do not give any hydraulically binding product as the iron oxides and the calcium combinations that they may give under such manufacturing conditions (melting, fusion of the mixture) remain only as inactive quantities.

The cements according to the present invention, do not require, after burning, to be ground as do all ordinary cements, which must be carefully ground in order to be salable.

It is possible to prepare mixed cements containing iron combinations by mixing a cement prepared according to this invention with ordinary cement containing alumina. The mixture may be utilized directly or after a supplementary burning.

The cements containing as binding elements iron combinations alumina, ferri-aluminates combined with calcium obtained without reaching the melting point of the mixture give mortars which are particularly resistant to the action of sea water or of waters containing $SO_4Ca$.

I claim:

1. A process of producing cements containing iron and aluminum combinations possessing hydraulic binding qualities, which consists in forming a mixture of raw materials containing $CaCO_3$, $Fe_2O_3$ and $Al_2O_3$ in the proportions of more than two molecules of $CaCO_3$ for each molecule of $Fe_2O_3$ and one molecule of $CaCO_3$ for each molecule of $Al_2O_3$ and burning said mixture at a temperature below the melting point of any of the ingredients.

2. A process of producing cements containing iron and aluminum combinations possessing hydraulic binding qualities, which consists in forming a mixture of raw materials containing iron oxide in the form of iron pyrite cinders, calcium carbonates and aluminum in the proportions of more than two molecules of $CaCO_3$ for each molecule of $Fe_2O_3$ and one molecule of $CaCO_3$ for each molecule of $Al_2O_3$, adding to the mixture a quantity of $CaCO_3$ sufficient to saturate the sulphur contained in the cinders as a sulphide, and burning said mixture at a temperature below the melting point of any of the ingredients.

3. A process of producing cements containing iron and aluminum combinations possessing hydraulic binding qualities, which consists in forming a mixture of raw materials containing iron oxide in the form of iron pyrite cinders, calcium carbonate and aluminum in the proportions of more than two molecules of $CaCO_3$ for each molecule of $Fe_2O_3$ and one molecule of $CaCO_3$ for each molecule of $Al_2O_3$, adding to the mixture one molecule of $CaCO_3$ for each atom of sulphur in the cinders, and burning said mixture at a temperature below the melting point of any of the ingredients.

4. A process of producing cements containing iron and aluminum combinations possessing hydraulic binding qualities, which consists in forming a mixture of raw materials containing $CaCO_3$, $Fe_2O_3$ and $Al_2O_3$ in the proportions of more than two molecules of $CaCO_3$ for each molecule of $Fe_2O_3$ and one molecule of $CaCO_3$ for each molecule of $Al_2O_3$, and burning said mixture at a temperature between 1100° C. and 1300° C.

5. A process of producing cements containing iron and aluminum combinations possessing hydraulic binding qualities, which consists in forming a mixture of raw materials containing $CaCO_3$, $Fe_2O_3$ and $Al_2O_3$ in the proportions of more than two molecules of $CaCO_3$ for each molecule of $Fe_2O_3$ and one molecule of $CaCO_3$ for each molecule of $Al_2O_3$, and burning said mixture at a temperature between 1100° C. and 1300° C., the burning being accomplished in successive stages.

In testimony whereof I affix my signature.

ERNEST MARTIN.